(12) United States Patent
Padhi et al.

(10) Patent No.: US 10,445,224 B2
(45) Date of Patent: Oct. 15, 2019

(54) VISIBLE ELEMENTS-BASED APPLICATION TESTING

(71) Applicant: Microsoft Technology Licensing, LLC, Redmond, WA (US)

(72) Inventors: Bikramaditya Padhi, Panathur (IN); Kramadhati Venkata Madhava Kumar, Ramachandrapuram (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 197 days.

(21) Appl. No.: 15/496,967

(22) Filed: Apr. 25, 2017

(65) Prior Publication Data
US 2018/0307590 A1    Oct. 25, 2018

(51) Int. Cl.
G06F 11/36    (2006.01)
G06K 9/00    (2006.01)

(52) U.S. Cl.
CPC ...... *G06F 11/3668* (2013.01); *G06F 11/3692* (2013.01); *G06F 11/3696* (2013.01); *G06K 9/00449* (2013.01); *G06K 9/00469* (2013.01)

(58) Field of Classification Search
CPC .................................................. G06F 11/3668
See application file for complete search history.

(56) References Cited

U.S. PATENT DOCUMENTS

| 9,213,463 B2 | 12/2015 | Freedman et al. | |
| 9,495,534 B2 | 11/2016 | Low et al. | |
| 2014/0109051 A1 | 4/2014 | Mcdonald et al. | |
| 2015/0378876 A1* | 12/2015 | Ji | G06F 11/3688 714/38.1 |

(Continued)

FOREIGN PATENT DOCUMENTS

| CN | 101655817 A | 2/2010 |
| KR | 20140002815 A | 1/2014 |
| WO | 2016206113 A1 | 12/2016 |

OTHER PUBLICATIONS

Kaur, Khushboo, "Mobile Automated Testing With Perfecto Mobile Part I", https://www.3pillarglobal.com/insights/part-1-mobile-automated-testing-with-perfecto-mobile, Retrieved on: Feb. 15, 2017, 7 pages.

(Continued)

*Primary Examiner* — John E Breene
*Assistant Examiner* — Jeffrey C Morgan
(74) *Attorney, Agent, or Firm* — Mannava & Kang, P.C.

(57) ABSTRACT

In some examples, visible elements-based application testing may include accessing, based on an analysis of a display of a page associated with execution of an application, an identification of elements and locations of the identified elements within the page. According to an example, each element of the identified elements may include a character. A determination may be made as to whether a word from a test script for testing the application is present in a set that includes at least two of the identified elements by comparing distances between a specified location of the word on the page and the locations of the identified elements. Further, in response to a determination that the word is present in the set of the identified elements, an operation associated with the word may be executed to test the application.

20 Claims, 15 Drawing Sheets

(56) References Cited

U.S. PATENT DOCUMENTS

2017/0031808 A1   2/2017   Gillaspie

OTHER PUBLICATIONS

"Region (rectangular pixel area on a screen)—SikuliX", http://sikulix-2014.readthedocs.io/en/latest/region.html, Published on: 2014, 27 pages.
Hocke, Raimund, "SikuliX by RaiMan", http://www.sikulix.com/, Retrieved on: Feb. 15, 2017, 5 pages.
"Imprimatur", https://qatestingtools.com/testing-tool/imprimatur, Retrieved on: Feb. 15, 2017, 3 pages.
"Autohotkey use OCR to locate variable on screen and move there mouse", http://stackoverflow.com/questions/39393538/autohotkey-use-ocr-to-locate-variable-on-screen-and-move-there-mouse, Retrieved on: Feb. 23, 2017, 3 pages.
"eggPlant Functional: Automated Mobile & Desktop UI Testing", https://www.testplant.com/eggplant/testing-tools/eggplant-developer/, Retrieved on: Feb. 15, 2017, 3 pages.

\* cited by examiner

```
for (Object region : regions)
{
    JSONArray lines = (JSONArray) ((JSONObject)region).get("lines");

for (Object line : lines) {
        JSONArray words = (JSONArray) ((JSONObject)line).get("words");
        //String wordsInLine = "";
        ArrayList<Bound> lineBounds = new ArrayList<Bound>();
        for (Object word : words) {
            //wordsInLine += (((JSONObject)word).get("text")+"----
"+((JSONObject)word).get("boundingBox"))+"||";
            Bound singleBound = new Bound();
            singleBound.setWord(((JSONObject)word).get("text").toString());
            String[] dims = (((JSONObject) word).get("boundingBox").toString().split(","));

if(Integer.parseInt(dims[1]) < 35) continue;//Ignore title bar texts singleBound.setX(dims[0]);
            singleBound.setY(dims[1]);
            singleBound.setWidth(dims[2]);
            singleBound.setHeight(dims[3]);
            lineBounds.add(singleBound);
        }
        Bound probable = getProability(lineBounds, pre, theWord, post);
        if(probable != null)
        {
            probables.add(probable);
        }
    }
}
```

FIG. 5

```
{
    int xPosition; //0,0 being left top coordinate from screen. X -> towards right
    int yPosition; //Y -> towards bottom
    int height; //height in pixels
    int width; // width in pixels
    String word;// the text that was found in previous step
}
```

FIG. 6

| Original point | match1 | match2 | match3 | ... |
|---|---|---|---|---|
| | d1 | d2 | d3 | ... |

FIG. 7 (700)

| Original point | match(min) | match(min-1) | match(min-2) | ... |
|---|---|---|---|---|
| | d(min) | d(min-1) | d(min-2) | ... |

FIG. 8 (800)

```
float score = 0.0
Char[] array1 = toCharArray('Accounts');         1100
Char[] array2 = toCharArray('Acoount');

Float incrementor = 1/array1.Length;        1102

Foreach( char c1 in array1)
      foreach(char c2 in array2)
             if(c1 ASCIIMatch( c2) )       1104
                   {
                                    score = score + incrementor;
                   }
      }
}
Return score;
```

FIG. 11

```
private static Bound getProability(ArrayList<Bound> lineBounds, String
pre, String theWord, String post) {
            Bound probable = null;
            for (Bound bounds : lineBounds)
            {
                    if (StringUtils.equalsIgnoreCase(bounds.getWord(),
theWord)) {
                            probable = bounds;
                    }
            }
            return probable;
}
private static Bound getDeepProability(ArrayList<Bound>
lineBounds, String pre, String theWord, String post) {
            Bound probable = null;
            for (Bound bounds : lineBounds)
            {
                    if (bounds.getWord().length() >2 &&
StringUtils.containsIgnoreCase(theWord, bounds.getWord())) {
                            probable = bounds;
                    }
            }
            return probable;
}
public static Bound deepDive(String response, String pre, String
theWord, String post, int occurance)
        {
            ArrayList<Bound> probables = new ArrayList<Bound>();

try
            {
                    JSONParser parser = new JSONParser();
                    JSONObject  jsonObj =
(JSONObject)parser.parse(response);
                    JSONArray regions = (JSONArray)
jsonObj.get("regions");
```

C#™
[DllImport("user32.dll", CharSet = CharSet.Auto, CallingConvention = CallingConvention.StdCall)]
DllImport("XYZ.dll")
private const uint MOUSEEVENTF_LEFTDOWN = 0x02;
private const uint MOUSEEVENTF_LEFTUP = 0x04;
Point p = XYZ.LocateText("user provided text",other parameters);
mouse_event(MOUSEEVENTF_LEFTDOWN | MOUSEEVENTF_LEFTUP, p.X, p.Y, 0, 0);

JAVA™
Import XYZ (XYZ.jar)
Point p = XYZ.LocateText("user provided text",other parameters);
Java.awt.Robot r = new Robot();
r.mouseMove(p.x, p.y); // move to co-ordinate Location
r.mousePress(InputEvent.BUTTON1_MASK); // Left Mouse click - Press
r.mouseRelease(InputEvent.BUTTON1_MASK); // Left Mouse click - Release

```
┌─────────────────────────────────────────────────────────────┐
│  ACCESS, BASED ON AN ANALYSIS OF A DISPLAY OF A PAGE        │
│  ASSOCIATED WITH EXECUTION OF AN APPLICATION, AN INDICATION │
│  OF ELEMENTS AND LOCATIONS OF THE ELEMENTS WITHIN THE PAGE  │
│                           1502                              │
└─────────────────────────────────────────────────────────────┘
                              │
                              ▼
┌─────────────────────────────────────────────────────────────┐
│  DETERMINE WHETHER A WORD FROM A TEST SCRIPT FOR TESTING    │
│   THE APPLICATION IS PRESENT IN A SET THAT INCLUDES AT      │
│   LEAST TWO OF THE ELEMENTS BY ANALYZING A REGION OF THE    │
│   ANALYZED PAGE TO IDENTIFY A LINE INCLUDING THE ELEMENTS,  │
│   ANALYZING THE LINE TO IDENTIFY THE ELEMENTS, AND          │
│   COMPARING DISTANCES BETWEEN A SPECIFIED LOCATION OF THE   │
│   WORD ON THE PAGE AND THE LOCATIONS OF THE IDENTIFIED      │
│                         ELEMENTS                            │
│                           1504                              │
└─────────────────────────────────────────────────────────────┘
                              │
                              ▼
┌─────────────────────────────────────────────────────────────┐
│  IN RESPONSE TO A DETERMINATION THAT THE WORD IS PRESENT IN │
│   THE SET OF THE IDENTIFIED ELEMENTS, EXECUTE AN OPERATION  │
│     ASSOCIATED WITH THE WORD TO TEST THE APPLICATION        │
│                           1506                              │
└─────────────────────────────────────────────────────────────┘
```

VISIBLE ELEMENTS-BASED APPLICATION TESTING

BACKGROUND

An application may be described as a computer program that is designed to perform a specified task, or a group of coordinated functions. Applications may include, for example, a web browser, a console game, an image editor, a word processor, etc. An application may be tested to determine whether the application is operating correctly.

BRIEF DESCRIPTION OF DRAWINGS

Features of the present disclosure are illustrated by way of example and not limited in the following figure(s), in which like numerals indicate like elements, in which:

FIG. 5 illustrates example code for searching a region in a page to illustrate operation of the visible elements-based application testing apparatus of FIG. 1 in accordance with an embodiment of the present disclosure;

FIG. 6 illustrates an example format of an identified element to illustrate operation of the visible elements-based application testing apparatus of FIG. 1 in accordance with an embodiment of the present disclosure;

FIG. 7 illustrates an example distance matrix to illustrate operation of the visible elements-based application testing apparatus of FIG. 1 in accordance with an embodiment of the present disclosure;

FIG. 8 illustrates example sorting of the distance matrix of FIG. 7 in accordance with an embodiment of the present disclosure;

FIG. 11 illustrates example logic to analyze elements in response to a determination that a test word is not present in an analyzed page to illustrate operation of the visible elements-based application testing apparatus of FIG. 1 in accordance with an embodiment of the present disclosure;

FIG. 12 illustrates example code to analyze elements in response to a determination that a test word is not present in an analyzed page to illustrate operation of the visible elements-based application testing apparatus of FIG. 1 in accordance with an embodiment of the present disclosure;

FIG. 13 illustrates a library application programming interface (API) based implementation including the visible elements-based application testing apparatus of FIG. 1 in accordance with an embodiment of the present disclosure;

FIG. 15 illustrates a flowchart of an example method for visible elements-based application testing in accordance with an embodiment of the present disclosure.

DETAILED DESCRIPTION

Figure 1:
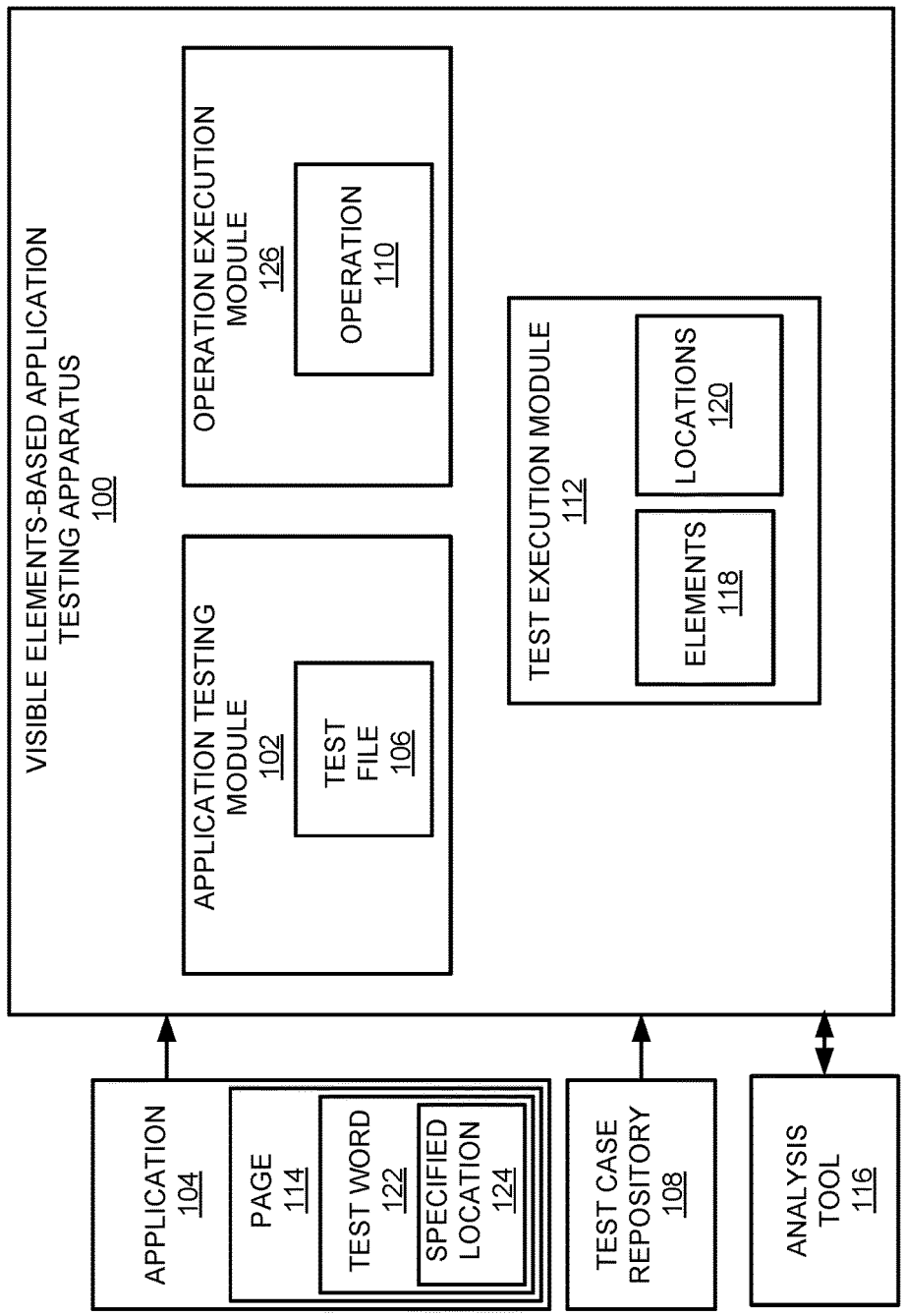
FIG. 1 illustrates a layout of a visible elements-based application testing apparatus in accordance with an embodiment of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Visible elements-based application testing apparatuses, methods for visible elements-based application testing, and non-transitory computer readable media having stored thereon machine readable instructions to provide visible elements-based application testing are disclosed herein. The apparatuses, methods, and non-transitory computer readable media disclosed herein provide for testing of an application based on an XML-based test script, analysis of a page associated with execution of the application to identify elements on the page, and a determination of whether a word from the test script (e.g., a test word as disclosed herein) is present in the set of the identified elements. In response to a determination that the test word is present in the set of the identified elements, an operation associated with the test word may be executed to test the application. A test word as disclosed herein may include a character or a plurality of characters, where a character may include text, a symbol, or any type of shape.

In the case of applications that may include different types of code, testing of such applications may present technical challenges with respect to analysis of the different types of code. For example, in order to test a specified functionality that is common to different applications including different types of code, different test scripts that are tailored to the different types of code may need to be generated to test the specified functionality. However, generation of different test scripts may be technically challenging from a development viewpoint. Moreover, as the different test scripts are being executed, such test scripts may be prone to popup or notifications that may result in failure of the test scripts. Further, implementation of different types of test scripts may be technically challenging from a resource utilization viewpoint. For example, different types of test scripts may need to communicate with an application using application programming interfaces (APIs) to analyze the code for the application. The analysis of the code for the application may result in processing overhead that may impact the functionality of the application. Moreover, the analysis of the code of an application may be limited to code that is accessible, or the analysis of the code of an application may not be permitted.

In order to address at least these technical challenges with respect to generation of different test scripts and resource utilization, the visible elements-based application testing as disclosed herein may provide for graphical user interface (GUI) based application testing that is independent of the code for an application. For example, the apparatuses, methods, and non-transitory computer readable media disclosed herein may provide for testing of an application (or a plurality of applications) based on analysis of a page associated with execution of the application, as opposed to code that is used to generate the page. In this regard, the page may be analyzed, for example, by using a cloud based analysis tool to identify elements and locations of the identified elements within the page. An analysis tool may include, for example, MICROSOFT AZURE™, and other such cloud based analysis tools. An element may be described as a word that may include a character or a plurality of characters, where a character may include text, a symbol, or any type of shape. The identified elements may be accessed to determine whether a test word from a test script for testing the application is present in the set that includes at least two of the identified elements. In response to a determination that the test word is present in the set of the identified elements, an operation associated with the test word may be executed to test the application. For example, the operation may include actions such as a mouse click, a mouse scroll, keyboard typing, etc., which may be performed by the apparatuses, methods, and non-transitory computer readable media disclosed herein, and/or by a robotic device controlled by the apparatuses, methods, and non-transitory computer readable media disclosed herein.

With respect to the analysis tool as disclosed herein, the analysis tool may apply, for example, image binarization and Optical Character Recognition (OCR) to identify elements within the page. The image binarization may segment each element from a background of the page. Results of the image binarization may be analyzed by an OCR engine to identify elements within the page. Examples of image binarization techniques may include techniques that use a fixed threshold for an image (e.g., global threshold techniques), and/or techniques that apply local thresholds (e.g., local binarization techniques). Techniques that use a global threshold may be used when the elements occupy a relatively large part of the page and are well contrasted from background. Alternatively, local binarization techniques may be used when the elements include relatively significant color variations.

According to an example, the analysis tool may apply local binarization to produce seed pixels, estimate seed pixel strength, and further implement global optimization. For example, the analysis tool may perform local binarization with a specified window size. The analysis tool may further determine a normalized absolute Laplacian value of page intensity at each pixel of the page. The Laplacian values may be used as a confidence for initial labeling of the local binarization. The analysis tool may perform global optimization to account for pixel similarity to correct errors with respect to the initial labeling of the local binarization. A resulting binary map may be analyzed by an OCR engine to identify elements within the page. An example of an OCR engine may include OMNIPAGE PROFESSIONAL™.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an example visible elements-based application testing apparatus (hereinafter also referred to as "apparatus 100").

Referring to FIG. 1, the apparatus 100 may include an application testing module 102 to ascertain an application 104 that is to be tested. The application testing module 102 may further ascertain a test file 106 from a test case repository 108, where the test file 106 is to be used to test the application 104. The test file 106 may include an XML-based test script that is to test an operation 110 of the application 104.

A test execution module 112 is to execute the application 104 to generate a page 114 that is to be used to test the application 104. The test execution module 112 may forward a screenshot (e.g., a display) of the page 114 to an analysis tool 116 that is to identify elements 118 and locations 120 of the identified elements within the page 114. The analysis tool 116 may include a cloud based analysis tool. According to an example, the test execution module 112 may forward a bitmap of the page 114 to the cloud based analysis tool 116.

The test execution module 112 is to further access, based on the analysis of the page 114, the identification of elements 118 and locations 120 of the identified elements within the page 114. The test execution module 112 may determine whether a word from a test script (hereinafter "test word 122") for testing the application 104 is present in a set that includes at least two of the identified elements 118. In this regard, the test script may include the test word 122 or a plurality of test words that are utilized for testing the application 104. For example, a test may include testing of the login functionality of an application, where the test words may include "username", "password", etc.

In response to a determination that the test word 122 is present in the set of the identified elements 118, an operation execution module 126 is to execute the operation 110 associated with the test word 122 to test the application 104. Examples of the operation 110 may include activation of a mouse click, a mouse scroll, keyboard typing, etc.

According to an example, with respect to determining whether the test word 122 for testing the application 104 is present in the set of the identified elements 118, the test execution module 112 may first analyze regions of the analyzed page (e.g., the analyzed results that are received from the analysis tool 116) to identify lines including the elements 118, and further analyze the lines to identify the elements 118. The regions of the analyzed page that are to be analyzed may be identified, for example, by grouping areas of the analyzed page that include the elements 118. Analysis of the regions and the lines by the test execution module 112 may be designated as a first filter pass.

According to an example, with respect to determining whether the test word 122 for testing the application 104 is present in the set of the identified elements 118, the test execution module 112 may compare distances between a specified location 124 of the test word 122 on the page 114 and the locations 120 of the identified elements 118. The comparison of distances between the specified location 124 of the test word 122 on the page 114 and the locations 120 of the identified elements 118 may be designated as a second filter pass.

With respect to comparison of distances between the specified location 124 of the test word 122 on the page 114 and the locations 120 of the identified elements 118, the test execution module 112 may determine whether the test word 122 is present in the set of the identified elements 118 by comparing the test word 122 to the identified elements 118 to determine potential matches. Further, the test execution module 112 may determine the distances between the specified location 124 of the test word 122 on the page 114 and the locations 120 of the identified elements 118 that are determined to be potential matches, and sort the determined distances in order of smallest distance to largest distance to rank the potential matches.

According to an example, with respect to determining whether the test word 122 for testing the application 104 is present in the set of the identified elements 118, the test execution module 112 may identify a specified number of the ranked potential matches. Further, the test execution module 112 may determine whether a specified neighbor word is adjacent to one of the identified ranked potential matches. For example, the test execution module 112 may determine whether the specified neighbor word is adjacent to one of the identified ranked potential matches in order of highest rank to lowest rank for the identified ranked potential matches. In response to a determination that the specified neighbor word is adjacent to one of the identified ranked potential matches, the operation execution module 126 is to execute the operation 110 with respect to the determined one of the identified ranked potential matches to test the application 104. The analysis by the test execution module 112 with respect to a specified neighbor word may be designated as a third filter pass.

According to an example, with respect to determining whether the test word 122 for testing the application 104 is present in the set of the identified elements 118, in response to a determination that the test word 122 is not present in the set of the identified elements 118, the test execution module 112 may identify characters of the test word 122. Further, the test execution module 112 may compare each identified character of the test word 122 to each character of the identified elements 118 to determine scores associated with the identified elements 118. The test execution module 112 may sort the identified elements 118 in order of highest score to lowest score to rank the identified elements 118. Further, the test execution module 112 may identify a specified number of the ranked elements as potential matches. With respect to the identified elements that are determined to be potential matches, the test execution module 112 may apply the second filter pass and the third filter pass as disclosed herein. For example, with respect to the second filter pass, the test execution module 112 may determine the distances between the specified location 124 of the test word 122 on the page 114 and the locations 120 of the identified elements 118 that are determined to be potential matches, and sort the determined distances in order of smallest distance to largest distance to rank the potential matches. With respect to the third filter pass, the test execution module 112 may identify a specified number of the ranked potential matches, and determine whether a specified neighbor word is adjacent to one of the identified ranked potential matches. Further, with respect to the third filter pass, in response to a determination that the specified neighbor word is adjacent to one of the identified ranked potential matches, the operation execution module 126 may execute the operation 110 with respect to the determined one of the identified ranked potential matches to test the application 104.

According to an example, the test execution module 112 may determine the scores by incrementing, for each identified character of the test word 122 that matches a character of an identified element, a value that represents an inverse of a total number of characters of the test word 122.

Operation of the modules of the apparatus 100 is described in further detail with reference to FIGS. 1-12.

Figure 2A:
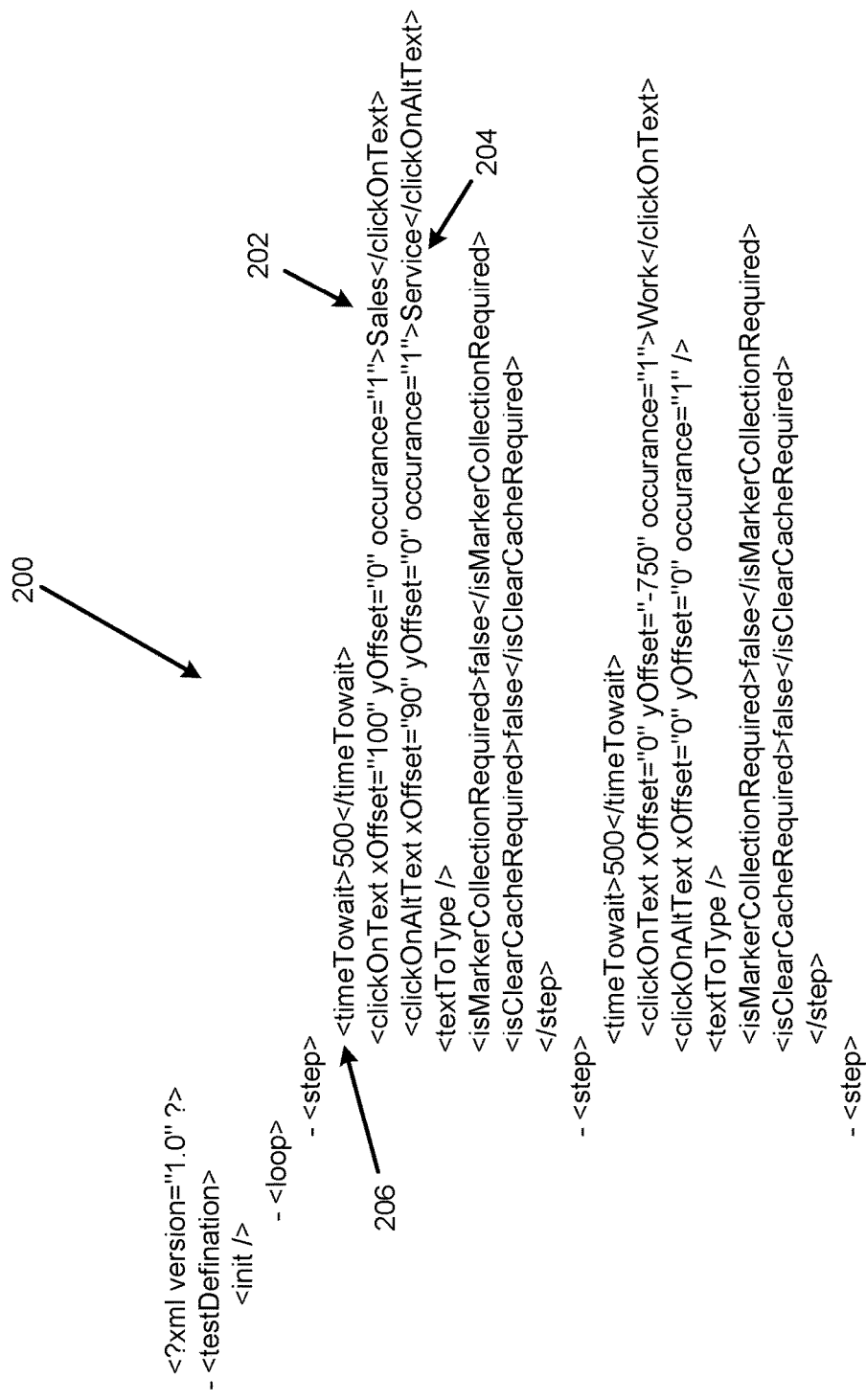
FIG. 2A illustrates an example eXtensible Markup Language (XML)-based test case to illustrate operation of the visible elements-based application testing apparatus of FIG. 1 in accordance with an embodiment of the present disclosure.

FIG. 2A illustrates an example XML-based test case to illustrate operation of the apparatus 100 in accordance with an embodiment of the present disclosure. Further, FIG. 2B illustrates an example page 114 to illustrate operation of the apparatus 100 in accordance with an embodiment of the present disclosure.

Figure 2B:
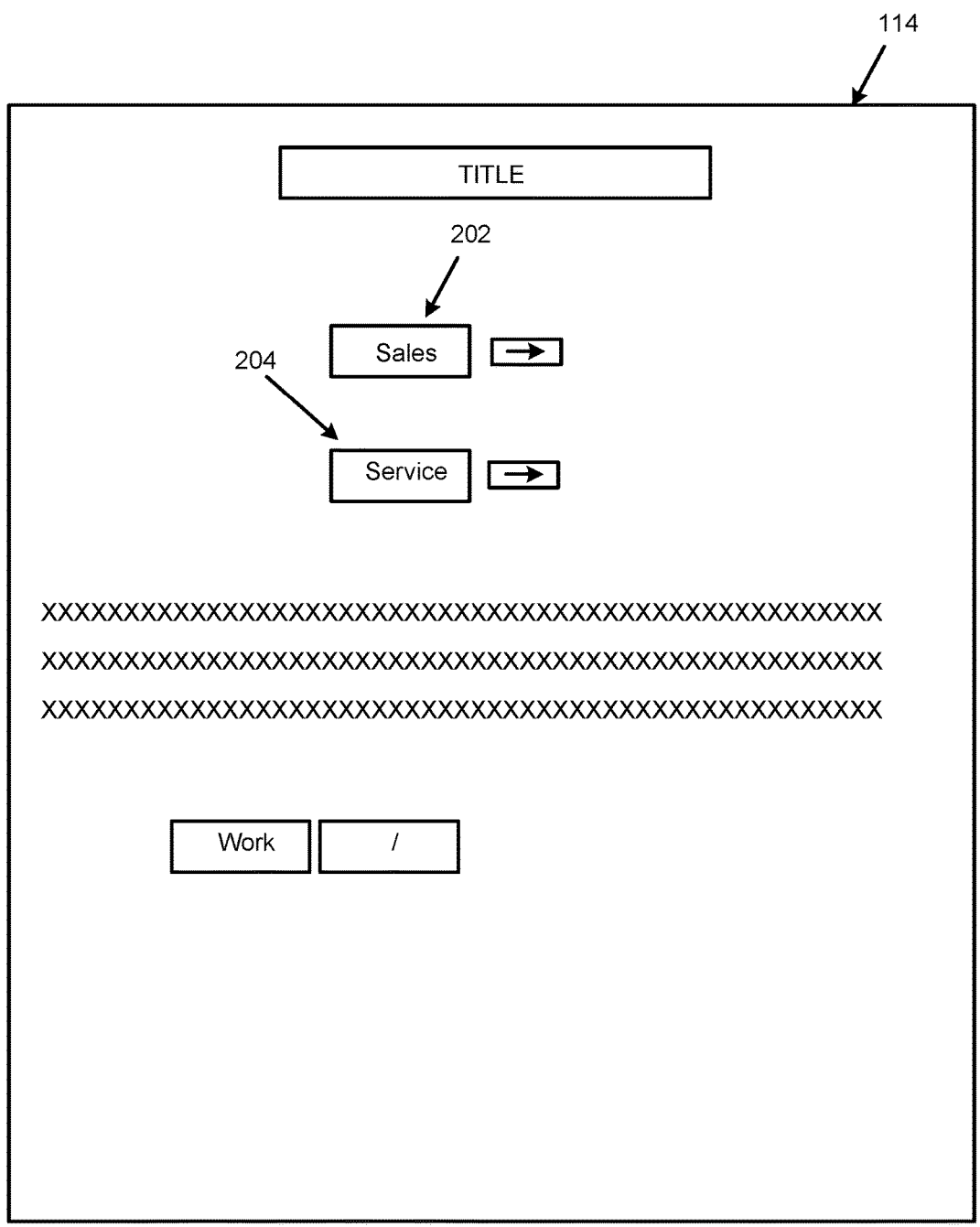
FIG. 2B illustrates an example page to illustrate operation of the visible elements-based application testing apparatus of FIG. 1 in accordance with an embodiment of the present disclosure.

Referring to FIGS. 1, 2A, and 2B, as disclosed herein, the application testing module 102 may ascertain the test file 106 from the test case repository 108, where the test file 106 is to be used to test the application 104. The test file 106 may include an XML-based test script, such as the test script 200, which is to be used to test the operation 110 of the application 104. For the example of FIGS. 2A and 2B, the test script 200 may include test words specified at 202, 204, etc. For example, the test word "Sales" at 202 and the alternate test word "Service" at 204 may be specified in the test script 200 under a loop scenario. In response to a determination that the test word "Sales" is present in the set of the identified elements 118, the operation 110 associated with the test word "Sales" at 202 may include clicking (e.g., activation of a mouse click) on a location determined as an 100% x-offset with respect to a width of the test word "Sales", and a 0% y-offset. Similarly, in response to a determination that the test word "Service" is present in the set of the identified elements 118, the operation 110 associated with the test word "Service" at 204 may include clicking (e.g., activation of a mouse click) on a location determined as a 90% x-offset with respect to a width of the test word "Service", and a 0% y-offset. In this manner, other operations specified by the test script 200 may be performed upon determination of whether a particular test word 122 is present in the set of the identified elements 118. Upon completion of the test scenario with respect to the test words 202 and 204, the test execution module 112 may proceed to testing with respect to further words as illustrated in FIG. 2A. For the example of FIG. 2A, the "timeTowait" at 206 may be a specified delay during which data on the page 114 may be captured.

Figure 3:
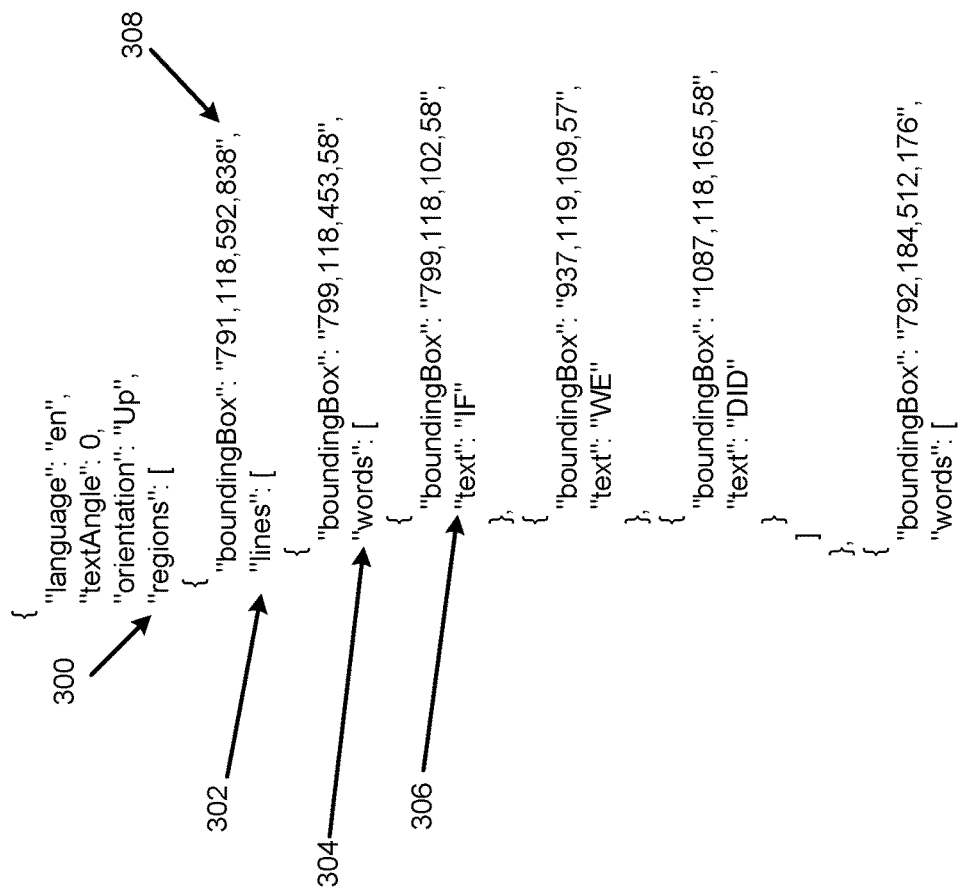
FIG. 3 illustrates region, line, and word identification to illustrate operation of the visible elements-based application testing apparatus of FIG. 1 in accordance with an embodiment of the present disclosure.

FIG. 3 illustrates region, line, and word identification to illustrate operation of the apparatus 100 in accordance with an embodiment of the present disclosure.

Referring to FIGS. 1-3, and particularly FIG. 3, as disclosed herein, with respect to determining whether the test word 122 for testing the application 104 is present in the set of the identified elements 118, the test execution module 112 may first analyze regions of the analyzed page (e.g., the analyzed results that are received from the analysis tool 116) to identify lines including the elements 118, and further analyze the lines to identify the elements 118. For example, for an analyzed page, the test execution module 112 may first analyze regions 300 of the analyzed page to identify lines 302 including the elements 118, and further analyze the lines 302 to identify the elements 118 (e.g., denoted "words" at 304). Further, the test execution module 112 may analyze the elements 118 to identify text 306 of the elements 118. According to an example, the regions, lines, words, and text may be determined using a bounding box approach. For example, the bounding box "791,118,592,838" at 308 may include an x-coordinate on the analyzed page of 791, a y-coordinate of 118, a width of 592, and a height of 838.

Figure 4:
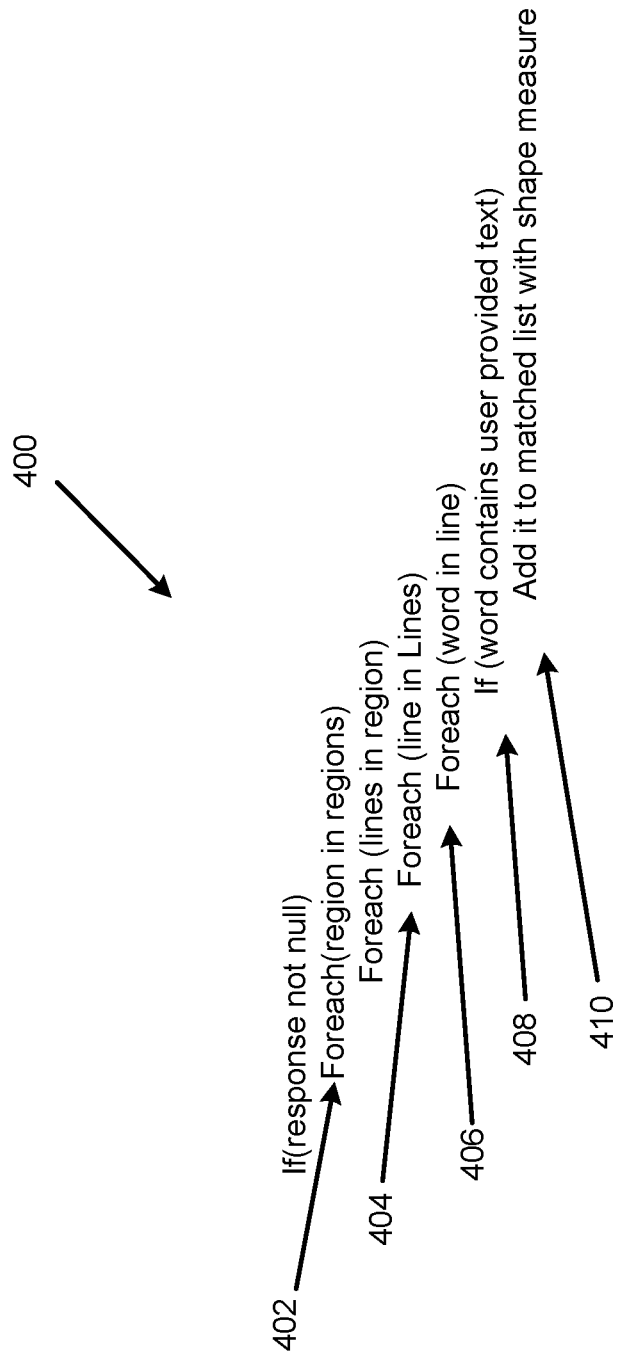
FIG. 4 illustrates match list generation to illustrate operation of the visible elements-based application testing apparatus of FIG. 1 in accordance with an embodiment of the present disclosure.

FIG. 4 illustrates match list generation to illustrate operation of the apparatus 100 in accordance with an embodiment of the present disclosure.

Referring to FIGS. 1-4, and particularly FIG. 4, as disclosed herein, the test execution module 112 may determine whether the test word 122 for testing the application 104 is present in the set of the identified elements 118. In this regard, the test execution module 112 may implement the example logic 400 of FIG. 4 to generate a match list. For example, the test execution module 112 may analyze each region at 402, each line at 404, each element (e.g., word as illustrated in FIG. 4) at 406, and determine at 408 whether the element includes the test word 122 (e.g., whether the "word contains user provided text" as indicated in FIG. 4, or a user provided character). In response to a determination that the element includes the test word 122, the element may be added to the match list at 410.

FIG. 5 illustrates example code 500 for searching a region in a page to illustrate operation of the apparatus 100 in accordance with an embodiment of the present disclosure.

Referring to FIGS. 1-5, and particularly FIG. 5, as disclosed herein, the test execution module 112 may analyze each region at 502, each line at 504, and each element (e.g., word) at 506 to determine whether the element includes the test word 122.

FIG. 6 illustrates an example format of an identified element to illustrate operation of the apparatus 100 in accordance with an embodiment of the present disclosure.

Referring to FIGS. 1-6, and particularly FIG. 6, as disclosed herein, with respect to determining whether the test word 122 for testing the application 104 is present in the set of the identified elements 118, the test execution module 112 may compare distances between the specified location 124 of the test word 122 on the page 114 and the locations 120 of the identified elements 118. The locations 120 may be in the format illustrated in FIG. 6, where FIG. 6 illustrates a single location. For example, the locations 120 may include an xPosition specified from a top left coordinate of the page 114, a yPosition, and height and width dimensions of the identified elements 118 specified in pixels.

FIG. 7 illustrates an example distance matrix to illustrate operation of the apparatus 100 in accordance with an embodiment of the present disclosure.

Referring to FIGS. 1-7, and particularly FIG. 7, as disclosed herein, with respect to comparison of distances between the specified location 124 of the test word 122 on the page 114 and the locations 120 of the identified elements 118, the test execution module 112 may determine whether the test word 122 is present in the set of the identified elements 118 by comparing the test word 122 to the identified elements 118 to determine potential matches. The distance for each comparison may be included in a matrix 700. For example, the matrix 700 may include a distance d1 for match-1, a distance d2 for match-2, etc.

FIG. 8 illustrates example sorting of the distance matrix 700 in accordance with an embodiment of the present disclosure.

Referring to FIGS. 1-8, and particularly FIG. 8, as disclosed herein, with respect to comparison of distances between a specified location 124 of the test word 122 on the page 114 and the locations 120 of the identified elements 118, the test execution module 112 may sort the determined distances in order of smallest distance to largest distance to rank the potential matches. For example, the sorted matrix 700 is illustrated at 800, where the determined distances are sorted in order of smallest distance to largest distance to rank the potential matches. Further, the test execution module 112 may identify a specified number of the ranked potential matches. For example, the test execution module 112 may identify the top three ranked potential matches for further analyses.

Figures 9, 10:
FIG. 9 illustrates example logic to traverse through a list to analyze the presence of a specified neighbor word to illustrate operation of the visible elements-based application testing apparatus of FIG. 1 in accordance with an embodiment of the present disclosure.
FIG. 10 illustrates example logic to analyze the presence of a specified neighbor word for the logic of FIG. 9 in accordance with an embodiment of the present disclosure.

FIG. 9 illustrates example logic to traverse through a list (e.g., the match list of FIG. 8) to analyze the presence of a specified neighbor word to illustrate operation of the apparatus 100 in accordance with an embodiment of the present disclosure. Further, FIG. 10 illustrates example logic to analyze the presence of a specified neighbor word for the logic of FIG. 9 in accordance with an embodiment of the present disclosure.

Referring to FIGS. 1-10, and particularly FIGS. 9 and 10, as disclosed herein, with respect to determining whether the test word 122 for testing the application 104 is present in the set of the identified elements 118, the test execution module 112 may determine whether a specified neighbor word is adjacent to one of the identified ranked potential matches. For example, as shown at 1000, the test execution module 112 may determine whether a specified neighbor word is adjacent (e.g., previous to or after) to one of the identified ranked potential matches. For example, assuming the test word 122 is "accounts", a specified neighbor word may include "receivable", which is after the test word "accounts".

FIG. 11 illustrates example logic to analyze elements in response to a determination that a test word is not present in an analyzed page to illustrate operation of the apparatus 100 in accordance with an embodiment of the present disclosure.

Referring to FIGS. 1-11, and particularly FIG. 11, as disclosed herein, with respect to determining whether the test word 122 for testing the application 104 is present in the set of the identified elements 118, in response to a determination that the test word 122 is not present in the set of the identified elements 118, the test execution module 112 may identify characters of the test word 122. The test word 122 may be considered to be not present if the test word 122 does not exactly match one of the identified elements 118. For example, assuming that the test word 122 is "accounts" and one of the identified elements 118 includes "account", the test word 122 may be considered to be not present. In this regard, per the example logic at 1100, the test execution module 112 may compare (e.g., at 1102) each identified character of the test word 122 to each character of the identified elements 118 (note that one identified element is analyzed in FIG. 11) to determine scores associated with the identified elements 118. At 1104, the test execution module 112 may determine the scores by incrementing, for each identified character of the test word 122 that matches a character of an identified element, a value (e.g., the incrementor) that represents an inverse of a total number of characters of the test word 122.

FIG. 12 illustrates example code to analyze elements in response to a determination that a test word is not present in an analyzed page to illustrate operation of the apparatus 100 in accordance with an embodiment of the present disclosure.

Referring to FIGS. 1-12, and particularly FIG. 12, as disclosed herein, with respect to determining whether the test word 122 for testing the application 104 is present in the set of the identified elements 118, in response to a determination that the test word 122 is not present in the set of the identified elements 118, the test execution module 112 may analyze, for example, at 1200, the characters of the test word 122 to identify a highest probability match. For example, assuming that the test word 122 is "accounts" and one of the identified elements 118 indicates "account", the test execution module 112 may identify a match with the highest probability (e.g., based on the highest score) based on the scores associated with the identified elements 118. For example, the highest probability may be determined as a function of the highest score on a scale of 0 to 1. The match with the highest probability may be further analyzed as disclosed herein with respect to the second and the third filter passes.

FIG. 13 illustrates a library application programming interface (API) based implementation including the apparatus 100 in accordance with an embodiment of the present disclosure.

Referring to FIGS. 1-13, and particularly FIG. 13, the apparatus 100 may be implemented such that the functionality thereof may be called as a library API. For example, implementation of the functionality as a library API with respect to the programming languages C#™ and JAVA™ is illustrated in FIG. 13, where the functionality may be called at "XYZ". However, the functionality may be implemented using various other programming languages. For the JAVA™ example, upon identification of the "user provided text", actions such as left mouse click, etc., as disclosed herein, may be performed.

Figure 14:
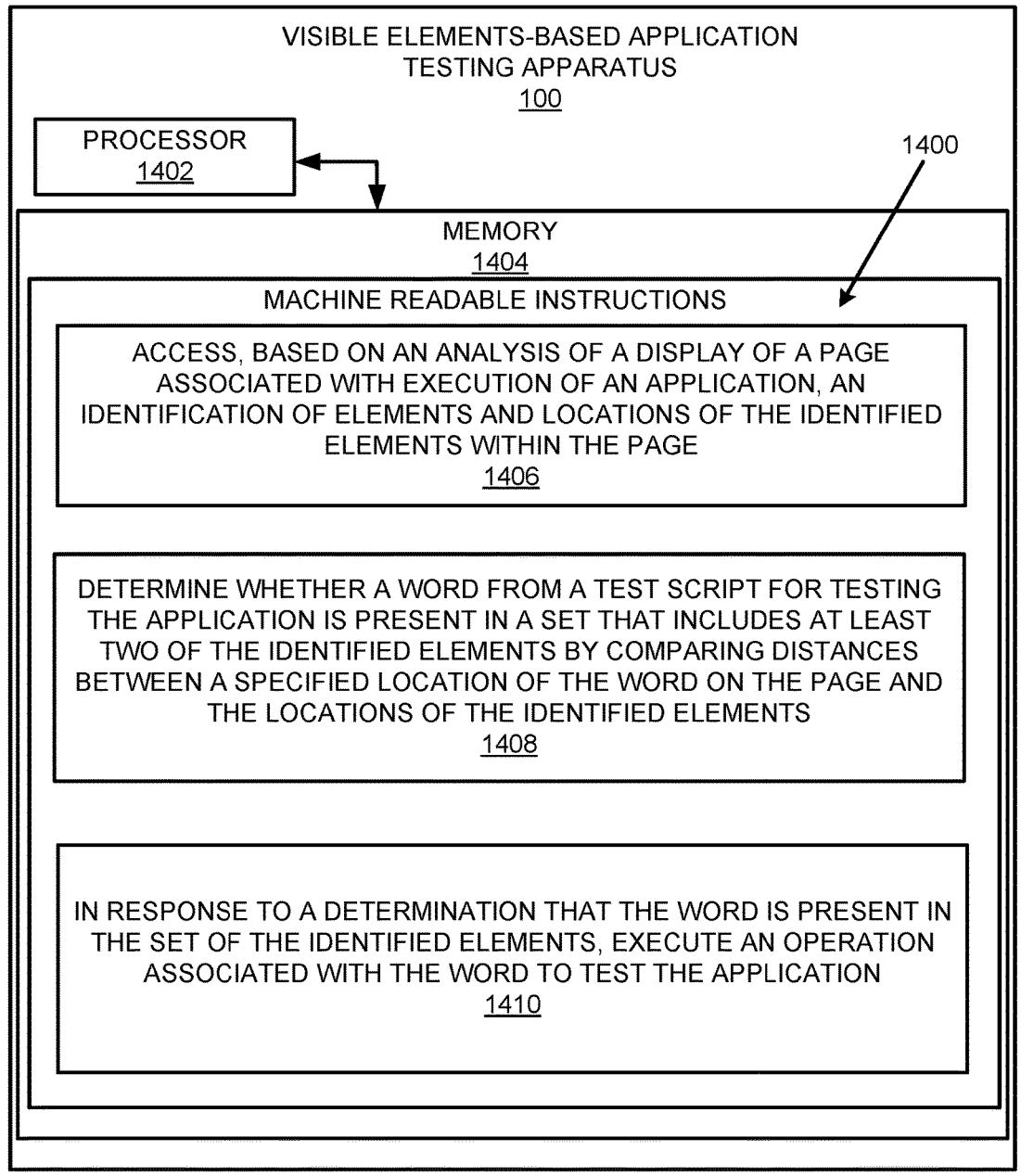
FIG. 14 illustrates an example block diagram for visible elements-based application testing in accordance with an embodiment of the present disclosure.
Figure 16:
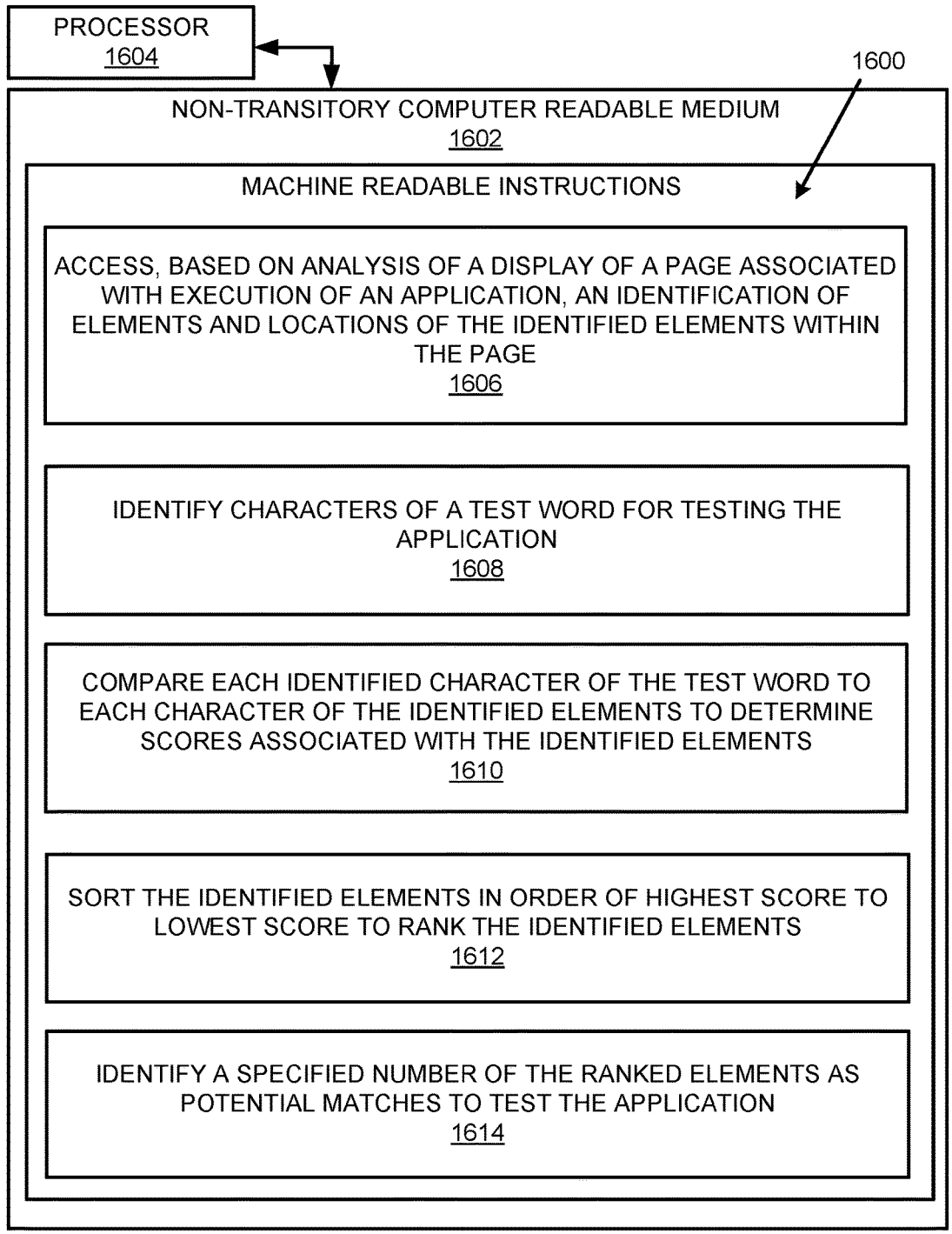
FIG. 16 illustrates a further example block diagram for visible elements-based application testing in accordance with another embodiment of the present disclosure.

FIGS. 14-16 respectively illustrate an example block diagram 1400, a flowchart of an example method 1500, and a further example block diagram 1600 for visible elements-based application testing, according to examples. The block diagram 1400, the method 1500, and the block diagram 1600 may be implemented on the apparatus 100 described above with reference to FIG. 1 by way of example and not of limitation. The block diagram 1400, the method 1500, and the block diagram 1600 may be practiced in other apparatus. In addition to showing the block diagram 1400, FIG. 14 shows hardware of the apparatus 100 that may execute the instructions of the block diagram 1400. The hardware may include a processor 1402, and a memory 1404 storing machine readable instructions that when executed by the processor cause the processor to perform the instructions of the block diagram 1400. The memory 1404 may represent a non-transitory computer readable medium. FIG. 15 may represent an example method for visible elements-based application testing, and the steps of the method. FIG. 16 may represent a non-transitory computer readable medium 1602 having stored thereon machine readable instructions to provide visible elements-based application testing according to an example. The machine readable instructions, when executed, cause a processor 1604 to perform the instructions of the block diagram 1600 also shown in FIG. 16.

The processor 1402 of FIG. 14 and/or the processor 1604 of FIG. 16 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1602 of FIG. 16), such as hardware storage devices (e.g., RAM (random access memory), ROM (read only memory), EPROM (erasable, programmable ROM), EEPROM (electrically erasable, programmable ROM), hard drives, and flash memory). The memory 1404 may include a RAM, where the machine readable instructions and data for a processor may reside during runtime.

Referring to FIGS. 1-14, and particularly to the block diagram 1400 shown in FIG. 14, the memory 1404 may include instructions 1406 to access, based on an analysis of a display of the page 114 associated with execution of an application 104, the identification of elements 118 and locations 120 of the identified elements 118 within the page 114.

The processor 1402 may fetch, decode, and execute the instructions 1408 to determine whether a word from a test script (e.g., the test word 122) for testing the application 104 is present in a set that includes at least two of the identified elements 118 by comparing distances between a specified location 124 of the test word 122 on the page 114 and the locations 120 of the identified elements 118.

In response to a determination that the test word 122 is present in the set of the identified elements 118, the processor 1402 may fetch, decode, and execute the instructions 1410 to execute the operation 110 associated with the test word 122 to test the application 104.

Referring to FIGS. 1-13 and 15, and particularly FIG. 15, for the method 1500, at block 1502, the method may include accessing, based on an analysis of a display of the page 114 associated with execution of an application 104, an indication of elements 118 and locations 120 of the elements 118 within the page 114.

At block 1504, the method may include determining whether a word from a test script (e.g., the test word 122) for testing the application 104 is present in a set that includes at least two of the elements 118 by analyzing a region of the analyzed page 114 to identify a line including the elements 118, analyzing the line to identify the elements 118, and comparing distances between the specified location 124 of the test word 122 on the page 114 and the locations 120 of the identified elements 118.

At block 1506, in response to a determination that the test word 122 is present in the set of the identified elements 118, the method may include executing the operation 110 associated with the test word 122 to test the application 104.

Referring to FIGS. 1-13 and 16, and particularly FIG. 16, for the block diagram 1600, the non-transitory computer readable medium 1602 may include instructions 1606 to access, based on analysis of a display of the page 114 associated with execution of the application 104, an identification of elements 118 and locations 120 of the identified elements 118 within the page 114.

The processor 1604 may fetch, decode, and execute the instructions 1608 to identify characters of a test word 122 for testing the application 104.

The processor 1604 may fetch, decode, and execute the instructions 1610 to compare each identified character of the test word 122 to each character of the identified elements 118 to determine scores associated with the identified elements 118.

The processor 1604 may fetch, decode, and execute the instructions 1612 to sort the identified elements 118 in order of highest score to lowest score to rank the identified elements 118.

The processor 1604 may fetch, decode, and execute the instructions 1614 to identify a specified number of the ranked elements 118 as potential matches to test the application 104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor; and
   a memory storing machine readable instructions that when executed by the processor cause the processor to:
   access, based on an analysis of a display of a page associated with execution of an application, an identification of elements and locations of the identified elements within the page, wherein each element of the identified elements includes a character;
   determine whether a word from a test script for testing the application is present in a set that includes at least two of the identified elements by comparing distances between a specified location of the word on the page and the locations of the identified elements; and
   in response to a determination that the word is present in the set of the identified elements, execute an operation associated with the word to test the application.

2. The apparatus according to claim 1, wherein the instructions are further to cause the processor to:
   determine whether the word is present in the set of the identified elements by comparing the word to the identified elements to determine potential matches;
   determine the distances between the specified location of the word on the page and the locations of the identified elements that are determined to be potential matches; and
   sort the determined distances in order of smallest distance to largest distance to rank the potential matches.

3. The apparatus according to claim 2, wherein the instructions are further to cause the processor to:
   identify a specified number of the ranked potential matches;
   determine whether a specified neighbor word is adjacent to one of the identified ranked potential matches; and
   in response to a determination that the specified neighbor word is adjacent to one of the identified ranked potential matches, execute the operation with respect to the determined one of the identified ranked potential matches to test the application.

4. The apparatus according to claim 3, wherein the instructions are further to cause the processor to:
   determine whether the specified neighbor word is adjacent to one of the identified ranked potential matches in order of highest rank to lowest rank for the identified ranked potential matches.

5. The apparatus according to claim 1, wherein each element of the identified elements includes a plurality of characters, and wherein the instructions are further to cause the processor to:
   in response to a determination that the word is not present in the set of the identified elements, identify characters of the word;
   compare each identified character of the word to each character of the identified elements to determine scores associated with the identified elements;
   sort the identified elements in order of highest score to lowest score to rank the identified elements; and
   identify a specified number of the ranked elements as potential matches.

6. The apparatus according to claim 5, wherein the instructions are further to cause the processor to:
   determine the distances between the specified location of the word on the page and the locations of the identified elements that are determined to be potential matches; and
   sort the determined distances in order of smallest distance to largest distance to rank the potential matches.

7. The apparatus according to claim 6, wherein the instructions are further to cause the processor to:
   identify a specified number of the ranked potential matches;
   determine whether a specified neighbor word is adjacent to one of the identified ranked potential matches; and
   in response to a determination that the specified neighbor word is adjacent to one of the identified ranked potential matches, execute the operation with respect to the determined one of the identified ranked potential matches to test the application.

8. The apparatus according to claim 5, wherein the instructions are further to cause the processor to:
   determine the scores by incrementing, for each identified character of the word that matches a character of an identified element, a value that represents an inverse of a total number of characters of the word.

9. The apparatus according to claim 1, wherein the operation includes at least one of activation of a mouse operation and activation of a keyboard typing operation.

10. A method comprising:
    accessing, based on an analysis of a display of a page associated with execution of an application, an indication of elements and locations of the elements within the page, wherein each element of the elements includes a character;
    determining, by a processor, whether a word from a test script for testing the application is present in a set that includes at least two of the elements by:
      analyzing a region of the analyzed page to identify a line including the elements;
      analyzing the line to identify the elements; and
      comparing distances between a specified location of the word on the page and the locations of the identified elements; and
    in response to a determination that the word is present in the set of the identified elements, executing an operation associated with the word to test the application.

11. The method according to claim 10, further comprising:
    determining whether the word is present in the set of the identified elements by comparing the word to the identified elements to determine potential matches;

determining the distances between the specified location of the word on the page and the locations of the identified elements that are determined to be potential matches; and sorting the determined distances in order of smallest distance to largest distance to rank the potential matches.

12. The method according to claim 11, further comprising:

identifying a specified number of the ranked potential matches;

determining whether a specified neighbor word is adjacent to one of the identified ranked potential matches; and in response to a determination that the specified neighbor word is adjacent to one of the identified ranked potential matches, executing the operation with respect to the determined one of the identified ranked potential matches to test the application.

13. The method according to claim 12, further comprising:

determining whether the specified neighbor word is adjacent to one of the identified ranked potential matches in order of highest rank to lowest rank for the identified ranked potential matches.

14. The method according to claim 10, wherein the analysis of the page associated with execution of the application includes the analysis of a bitmap of the page.

15. The method according to claim 10, wherein the word to test the application includes a single character.

16. A non-transitory computer readable medium having stored thereon machine readable instructions, the machine readable instructions, when executed by a processor, cause the processor to:

access, based on analysis of a display of a page associated with execution of an application, an identification of elements and locations of the identified elements within the page, wherein each element of the identified elements includes a plurality of characters;

identify characters of a test word for testing the application;

compare each identified character of the test word to each character of the identified elements to determine scores associated with the identified elements;

sort the identified elements in order of highest score to lowest score to rank the identified elements; and identify a specified number of the ranked elements as potential matches to test the application.

17. The non-transitory computer readable medium according to claim 16, wherein the instructions are further to cause the processor to:

determine distances between a specified location of the test word on the page and the locations of the identified elements that are determined to be potential matches; and sort the determined distances in order of smallest distance to largest distance to rank the potential matches.

18. The non-transitory computer readable medium according to claim 17, wherein the instructions are further to cause the processor to:

identify a specified number of the ranked potential matches;

determine whether a specified neighbor word is adjacent to one of the identified ranked potential matches; and in response to a determination that the specified neighbor word is adjacent to one of the identified ranked potential matches, execute an operation with respect to the determined one of the identified ranked potential matches to test the application.

19. The non-transitory computer readable medium according to claim 16, wherein the instructions are further to cause the processor to:

determine the scores by incrementing, for each identified character of the test word that matches a character of an identified element, a value that represents an inverse of a total number of characters of the test word.

20. The non-transitory computer readable medium according to claim 16, wherein the analysis of the page associated with execution of the application includes the analysis of a bitmap of the page.

* * * * *